March 15, 1932.  F. A. VAN BEZEL  1,849,892

THRUST BEARING

Filed July 11, 1930

Frank A. Van Bezel
INVENTOR

BY Victor J. Evans
ATTORNEY

Patented Mar. 15, 1932

1,849,892

UNITED STATES PATENT OFFICE

FRANK A. VAN BEZEL, OF EL CENTRO, CALIFORNIA, ASSIGNOR TO DUAL AIRCRAFT MOTORS INC., LTD., OF EL CENTRO, CALIFORNIA

THRUST BEARING

Application filed July 11, 1930. Serial No. 467,370.

This invention relates to bearings and has especial relation to thrust bearings, an object of the invention being to provide a bearing for the drive shaft of an airplane engine, which will take the thrust of the propeller and prevent such thrust from reaching the main bearings of the shaft.

Another object of the invention is the provision of a bearing of the above character which is simple in construction; efficient in use; may be quickly and easily attached to the engine base, and may be accurately adjusted with respect to the base and the main bearings, so that when in place, none of the thrust of the propeller will reach said main bearings.

With the above and other objects in view, the invention further includes the following novel features and details of construction, to be hereinafter more fully described, illustrated in the accompanying drawings and pointed out in the appended claims.

In the drawings:—

Figure 1:
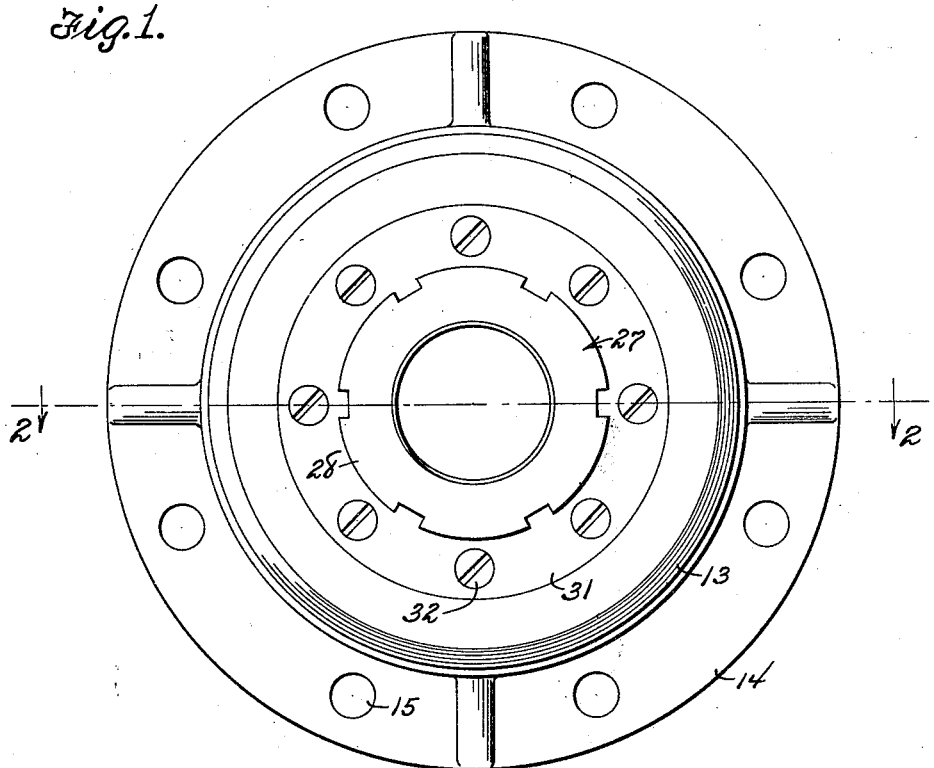
Figure 1 is a front elevation of the bearing.
Figure 2:
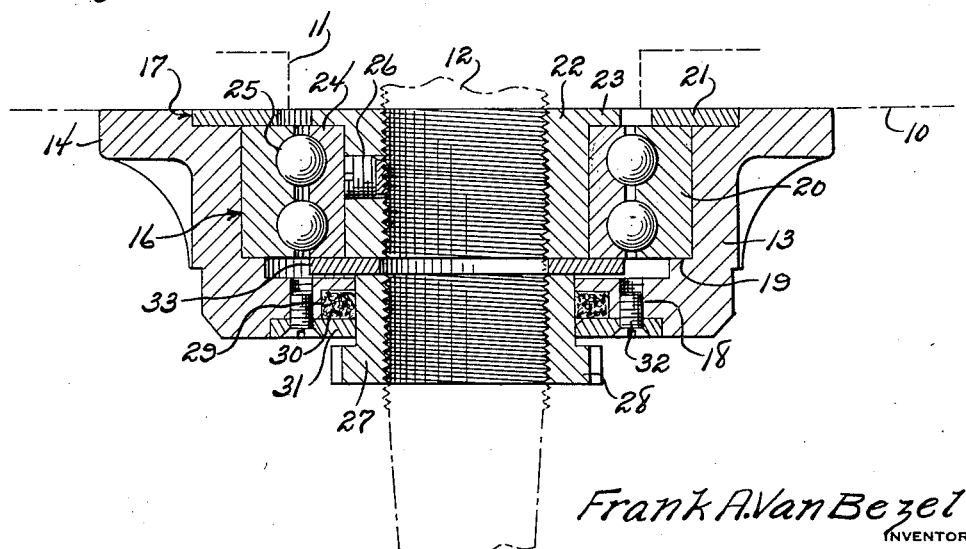
Figure 2 is a section on the line 2—2 of Figure 1, a portion of the walls of the engine base and the drive shaft being shown by dotted lines.

Referring to the drawings in detail wherein like characters of reference denote corresponding parts, the bearing is adapted for use in connection with the base of an engine which forms the subject matter of an application filed on or about July 11, 1930, Serial No. 467,369. A portion of one of the end walls of this base is shown by dotted lines and is indicated at 10, the said wall being provided with an opening 11 for the passage of the drive shaft 12. This shaft is threaded throughout a portion of its length and is tapered to receive the hub of the propeller.

The bearing comprises a housing 13 which is provided with an annular attaching flange 14. This flange is adapted to abut the end wall 10 and is provided with openings 15 for the passage of bolts.

The housing is provided with a main bore 16 and a counterbore 17 at the inner end of the main bore, while extending inwardly at the outer end of the housing is a flange 18. The main bore is provided at one end with a shoulder 19 and positioned within this bore and bearing against this shoulder is one member 20 of an anti-friction bearing. A ring or annulus 21 is positioned within the counterbore 17 and bears against the inner end of the member 20.

Threadedly mounted upon the shaft 12 is a sleeve 22. This sleeve is provided with a flange 23 which is spaced from the ring 21 and is engaged by a member 24 of the anti-friction bearing. Anti-friction devices 25 are located between the members 20 and 24. The sleeve is threadedly adjustable upon the shaft and is held in adjusted position by means of a set screw 26.

Also threadedly adjustable upon the shaft 12 is a retaining nut 27. This nut is provided with a notched flange 28 for engagement by a suitable spanner or tool for the purpose of rotating the nut. The flange 18 of the housing 13 is recessed as shown at 29 for the reception of a packing 30 and this packing is held in place by means of a ring 31 which is removably secured to the flange by means of screws or like fastening devices 32.

Located between the sleeve 22 and the nut 27 is a floating washer 33. This washer surrounds the shaft and engages the anti-friction bearing and adjustment of the latter may be effected through the medium of the nut 27.

In positioning the bearing, the sleeve 22 is threaded upon the shaft 12 and the remaining parts of the bearings are slipped into position over this sleeve so that the inner end of the sleeve may be properly aligned with the outer face of the engine base and the inner face of the bearing housing. After proper adjustment has been effected, the screw 26 is set to hold the sleeve in position. For this purpose, the bearing of course must be removed. After the screw has been set the bearing is replaced and bolted to the engine base by means of bolts passing through the openings 15 and corresponding openings in the base. As the member 20 of the anti-friction bearing is stationary within the housing and the member 24 is rotatable with the sleeve 22, and as these members are held against any movement longitudinally of the shaft, none of the thrust of the propeller can reach the main bearings of the shaft and cause binding. By adjustment of the nut 27, the anti-friction bearing can be locked in place while the packing 30 may be readily renewed by removing this nut and removing the ring 31.

By reference to the drawings, it will be seen that the bearing acts to take up thrust in opposite directions, thrust in a direction toward the engine crank case or base being taken up by the washer 33, the bearing 20 and the annulus 21. Outward thrust will be taken up by the flange 23, the bearing 20 and the shoulder 19. The bearing may therefore be used either with a propeller of the traction type, or the pusher type.

The invention is susceptible of various changes in its form, proportions and minor details of construction and the right is herein reserved to make such changes as properly fall within the scope of the appended claims.

Having described the invention what is claimed is:—

1. In a thrust bearing for an engine drive shaft, a housing adapted to be secured to the engine base, a stationary ball race located within the housing, a retaining ring for said race, a flanged sleeve for threaded engagement with the shaft at the inner end of the housing, a retaining nut to threadedly engage the shaft at the other end of the housing, a floating washer positioned between the sleeve and retaining nut, and a rotatable ball race clamped between the flange of the sleeve and the floating washer, and anti-friction balls between the races.

2. In a thrust bearing for the drive shaft of an airplane engine, a housing adapted to be secured to the engine base, a flanged sleeve adapted to be threadedly adjusted upon the drive shaft with respect to the outer face of said base, means to hold the sleeve in adjusted position, a retaining nut also adapted to be threaded upon the shaft, a floating washer between the sleeve and nut, and an anti-friction bearing between the sleeve and the inner wall of the housing and the washer and the flange of said sleeve.

3. In a thrust bearing for the drive shaft of an airplane engine, a housing adapted to be secured to the engine base, said housing including an inner attaching flange and having a main bore and a flange extending inwardly from the outer end of the housing, an interiorly threaded flanged sleeve adapted to be threadedly engaged with the shaft and adjusted with respect to the attaching flange, a retaining nut adapted to be threadedly engaged with the shaft and to extend within the flange at the outer end of the housing, a floating washer between the sleeve and nut, and an antifriction bearing within the main bore of the housing between the washer and the flange of the sleeve and engaging said sleeve.

4. In a thrust bearing for the drive shaft of an airplane engine, a housing adapted to be secured to the engine base, said housing including an inner attaching flange and having a main bore and a flange extending inwardly from the outer end of the housing, an interiorly threaded flanged sleeve adapted to be threadedly engaged with the shaft and adjusted with respect to the attaching flange, a retaining nut adapted to be threadedly engaged with the shaft and to extend within the flange at the outer end of the housing, a floating washer between the sleeve and nut, an anti-friction bearing within the main bore of the housing between the washer and the flange of the sleeve and engaging said sleeve, a packing within the inner periphery of the inwardly extending flange of the housing, and a removable ring to retain the packing in position.

In testimony whereof I affix my signature.

FRANK A. VAN BEZEL.